US009778810B2

(12) United States Patent
Bederson et al.

(10) Patent No.: US 9,778,810 B2
(45) Date of Patent: Oct. 3, 2017

(54) TECHNIQUES TO MODIFY CONTENT AND VIEW CONTENT ON MOBILE DEVICES

(75) Inventors: Benjamin B. Bederson, Chevy Chase, MD (US); John SanGiovanni, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 738 days.

(21) Appl. No.: 12/836,424

(22) Filed: Jul. 14, 2010

(65) Prior Publication Data

US 2012/0210259 A1 Aug. 16, 2012

Related U.S. Application Data

(60) Provisional application No. 61/225,366, filed on Jul. 14, 2009.

(51) Int. Cl.
*G06F 3/0481* (2013.01)

(52) U.S. Cl.
CPC ........ *G06F 3/0481* (2013.01); *G06F 3/04817* (2013.01)

(58) Field of Classification Search
CPC ............................ G06F 3/0481; G06F 3/04817
USPC ........................................................ 715/765
See application file for complete search history.

(56) References Cited

U.S. PATENT DOCUMENTS

| 5,949,428 A * | 9/1999 | Toelle | G06T 11/001 345/589 |
| 2004/0080670 A1 * | 4/2004 | Cheatle | 348/441 |
| 2007/0245256 A1 * | 10/2007 | Boss | G06F 3/0481 715/768 |
| 2008/0068507 A1 * | 3/2008 | Krause et al. | 348/570 |
| 2008/0122858 A1 * | 5/2008 | Wilensky | 345/592 |
| 2008/0165141 A1 * | 7/2008 | Christie | 345/173 |
| 2009/0060334 A1 * | 3/2009 | Rayner | G11B 27/034 382/173 |
| 2010/0064223 A1 * | 3/2010 | Tilton | 715/732 |

FOREIGN PATENT DOCUMENTS

WO WO 2007091081 A2 * 8/2007

OTHER PUBLICATIONS

Quinn, A., et al., "Readability of Scanned Books in Digital Libraries," Proceedings of ACM CHI, CHI 2008, Apr. 5-10, 2008, pp. 705-714, ACM Press.
Good, L. et al. "Zoomable User Interfaces as a Medium for Slide Show Presentations," Information Visualization, 2002, vol. 1, pp. 35-49, Palgrave Macmillan.

* cited by examiner

*Primary Examiner* — Jennifer To
*Assistant Examiner* — Ashley Fortino
(74) *Attorney, Agent, or Firm* — Norton Rose Fulbright US LLP

(57) ABSTRACT

A computer-based method for rendering modified graphical content is disclosed. The graphical content includes a plurality of cells. The method includes receiving the graphical content with metadata modifying the graphical content, rendering the graphical content upon a screen according to the metadata, and receiving user input. The method also includes in response to the user input, progressing through at least a subset of the cells, wherein the progressing includes moving a camera view from cell to cell in the at least a subset, each of the cells in the at least a subset being displayed as a focus point with surrounding area being adjusted in opacity according to the metadata.

20 Claims, 19 Drawing Sheets

TECHNIQUES TO MODIFY CONTENT AND VIEW CONTENT ON MOBILE DEVICES

CROSS-REFERENCE TO RELATED APPLICATIONS

This application claims the benefit of U.S. Provisional Application No. 61/225,366, filed Jul. 14, 2009 and entitled, "SYSTEMS AND METHODS PROVIDING TECHNIQUES TO MODIFY CONTENT AND VIEW CONTENT ON MOBILE DEVICES," the disclosure of which is incorporated herein by reference.

BACKGROUND

Comic books, graphic novels, and other graphic media are quite popular among some readers. Some graphic media include sequential, rectangular cells where the story is told as the sequence of cells progresses from right to left. More modern forms of the media often include cells that have irregularly shaped boundaries and/or arrange the cells in irregular patterns upon the page that do not progress from right to left.

Recently, there have been attempts to adapt comic book reader interfaces to handheld devices, such as the iPhone™, available from Apple, Inc. Currently, most comic book readers on the iPhone™ do the same thing. They have a series of sequential images that are cropped from a comic book, and the user reads the comics in the same way that a user browses photos in the photo library. In other words, a user drags his or her finger across the display screen to go left or right to an adjacent square located to the left or right. However, such a technique is not suitable for a page that has irregularly-shaped cells and/or an irregular arrangement of cells. Furthermore, the cropping and rearranging of cells often destroys the look and feel that was intended by the author. A more intuitive and less destructive comic book reading interface is, therefore, desirable.

BRIEF SUMMARY

Various embodiments of the invention are directed to systems, methods, and computer program products for editing existing content to be viewed on mobile device screens. In one example, a computer-based tool allows a designer to edit content so that the content is more conveniently and intuitively consumed on small screens (e.g., screens of mobile devices). In one embodiment, there is an application for providing metadata to pre-existing media content where the application allows a designer (or other user) to indicate salient visual features for portions of visual content. The application uses vision algorithms to automatically generate other kinds of metadata based on the positions of the salient features and other characteristics of the graphical content. The designer would then approve or modify the generated metadata. Additionally or alternatively, any of the metadata can be manually entered by the designer using the computer-based tool.

In another aspect, various embodiments are directed to systems, methods, and computer program products for viewing graphic and/or textual media on small screens. In one example, a viewing application receives graphical content and metadata (such as that produced using the tool described above) and renders the graphical content according to the metadata. For instance, for each portion that has a salient feature (e.g., each cell on a page of a comic book), there is a pan, a rotation, and a magnification associated therewith. When a selected portion is the focus, other portions that may appear on the screen can be modified to increase focus on the first portion (e.g., by adjusting opacity of the portions that are not the focus). A first screen may show many portions from which a user can select a portion to view. When a user has selected, and is viewing, a particular portion, the user can move to a previous or subsequent portion by, e.g., a finger swipe on a display screen. A camera view on the first portion then moves to the next selected portion as the next selected portion is displayed according to the metadata.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

An example embodiment of a viewing application, being run on a handheld device and rendering content upon a display screen, is shown in FIGS. 1-9.

DETAILED DESCRIPTION

Figure 1:
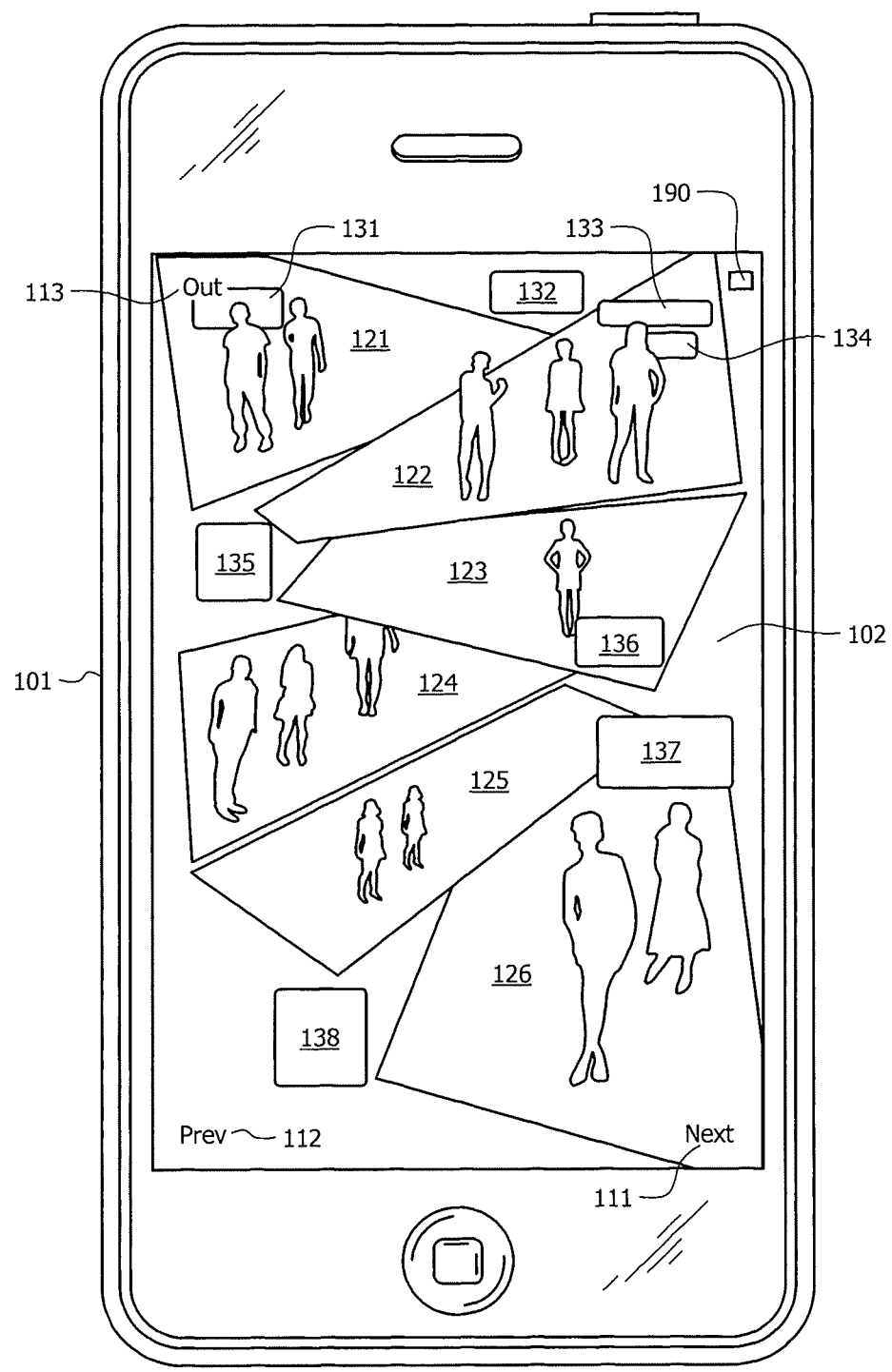

An example embodiment of a viewing application, being run on a handheld device and rendering content upon a display screen, is shown in FIGS. 1-9. FIG. 1 shows handheld device 101 with display screen 102 (in this case, a touch-screen that receives user input through user touching of the screen). Control features 111, 112, 113 and 190 are rendered upon screen 102 and are described further below. The view shown in FIG. 1 includes cells 121-126, which in this example are individually viewable portions of the page. Also included in the view are text boxes 131-138.

An example of a handheld device that can be used in some embodiments is the iPhone™ by Apple Inc., though other handheld devices can be used as well. However, not all embodiments are limited to handheld devices, as some embodiments use a larger display screen for rendering graphical content. Furthermore, devices without touch screens can be adapted for use in some embodiments, by, e.g., mapping keys to control features and frames. Additionally, some embodiments may be adapted for rendering graphical content upon a screen of a tablet computer, such as an iPad™ from Apple, Inc.

Typically it is difficult to come up with a pattern for reading a page such as that shown in FIG. 1 on a mobile phone. In this view, the text is too small to view, and the cells are shaped irregularly and are arranged in a sequential fashion that follows their irregular shapes. Various embodiments of the present invention are different from conventional approaches and provide a better way to render graphical content, as shown in FIGS. 2-9.

Figure 2:
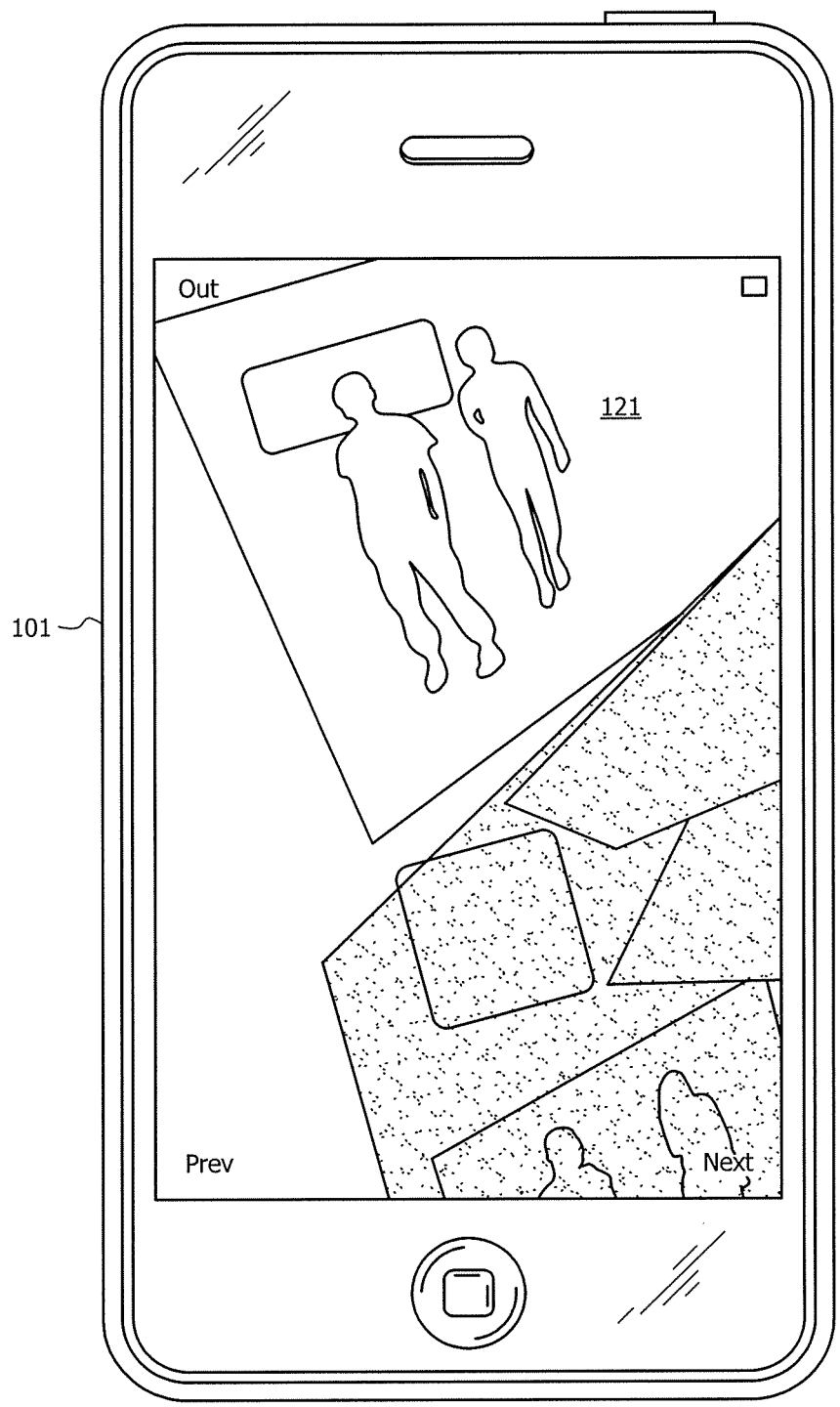
Figure 3:
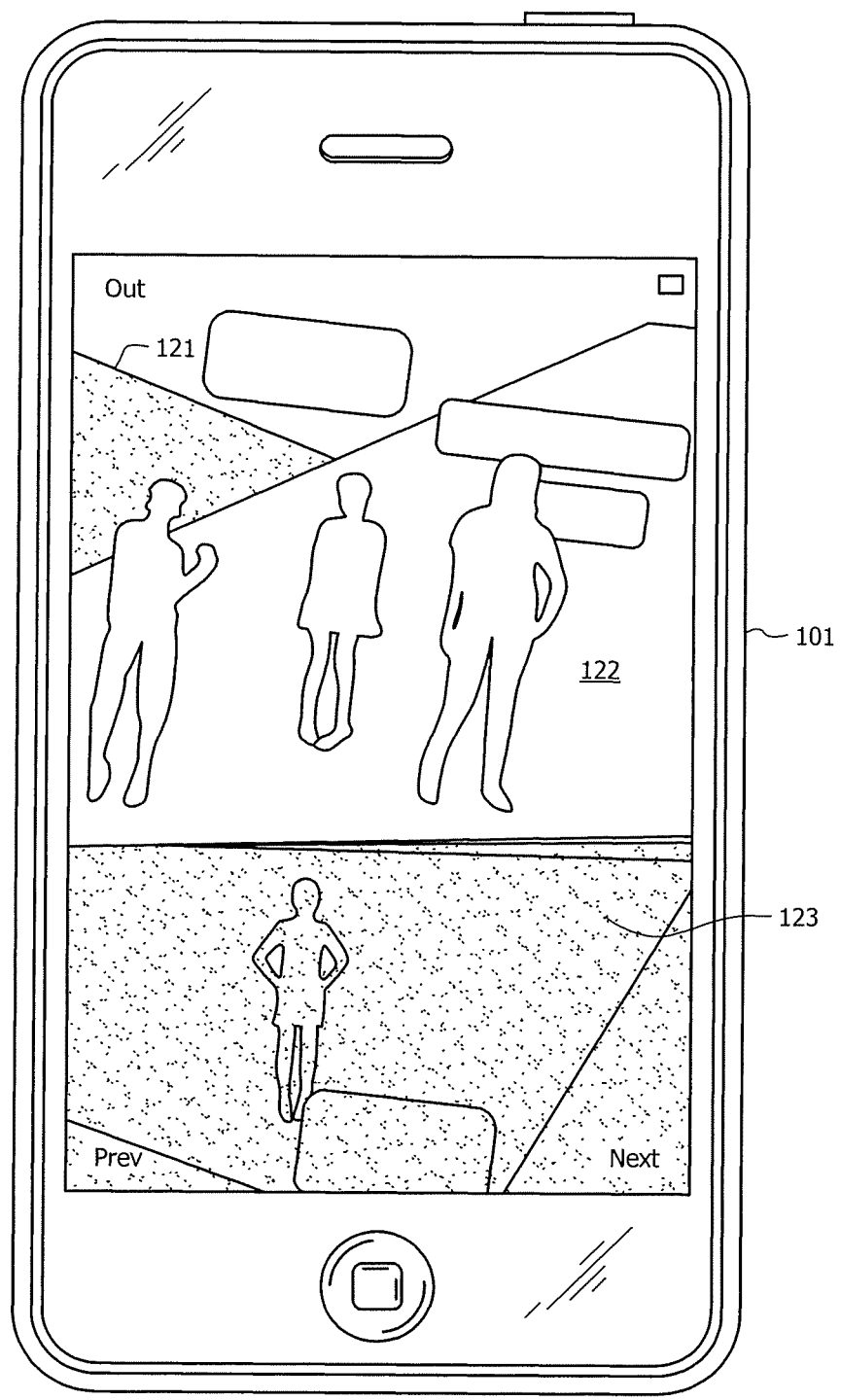

By selecting next 111, the user can step through the comic book. FIG. 2 shows a view after the user selects next 111. The transition (not shown) includes an animated zoom and pan into the upper left hand corner of the page shown in FIG. 1. Cell 121 is the focus of FIG. 2, and it is placed and zoomed according to metadata associated with the graphical content (as explained in more detail below). When the user clicks next 111 again, the whole page pans and rotates to present the content shown in FIG. 3, where cell 122 is the focus. In FIG. 3, cells 121 and 123, which are not the focus of the view of FIG. 3, are faded out slightly.

In one example, the fading effect is implemented by rendering a semi-transparent, or semi-opaque, mask on top of the cells that are not the focus. Applying a mask may be preferable in some embodiments, since it may not be necessary to modify the underlying existing content when a mask can be applied on top of the content. However, some embodiments may include modifying the content itself.

Figure 4:
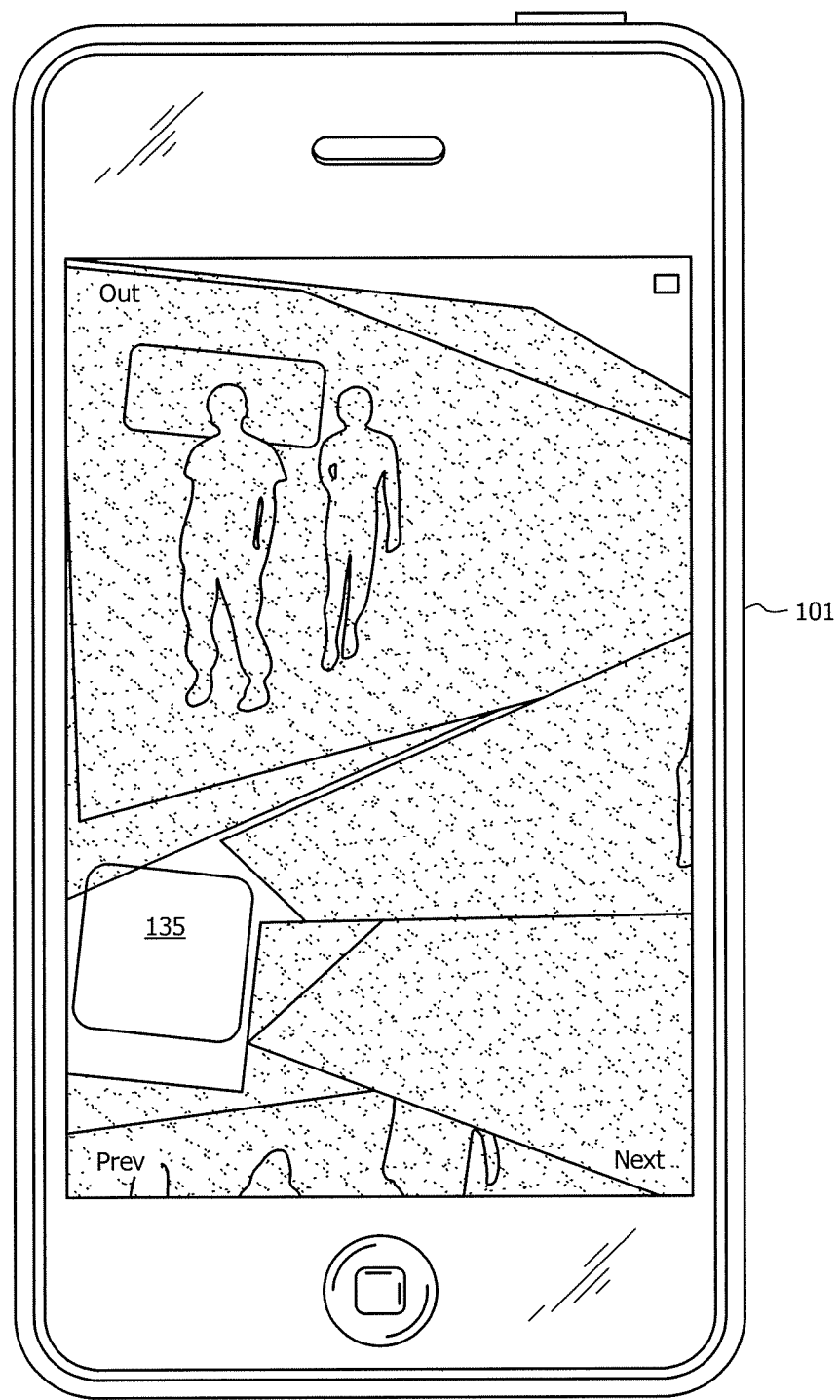
Figure 5:
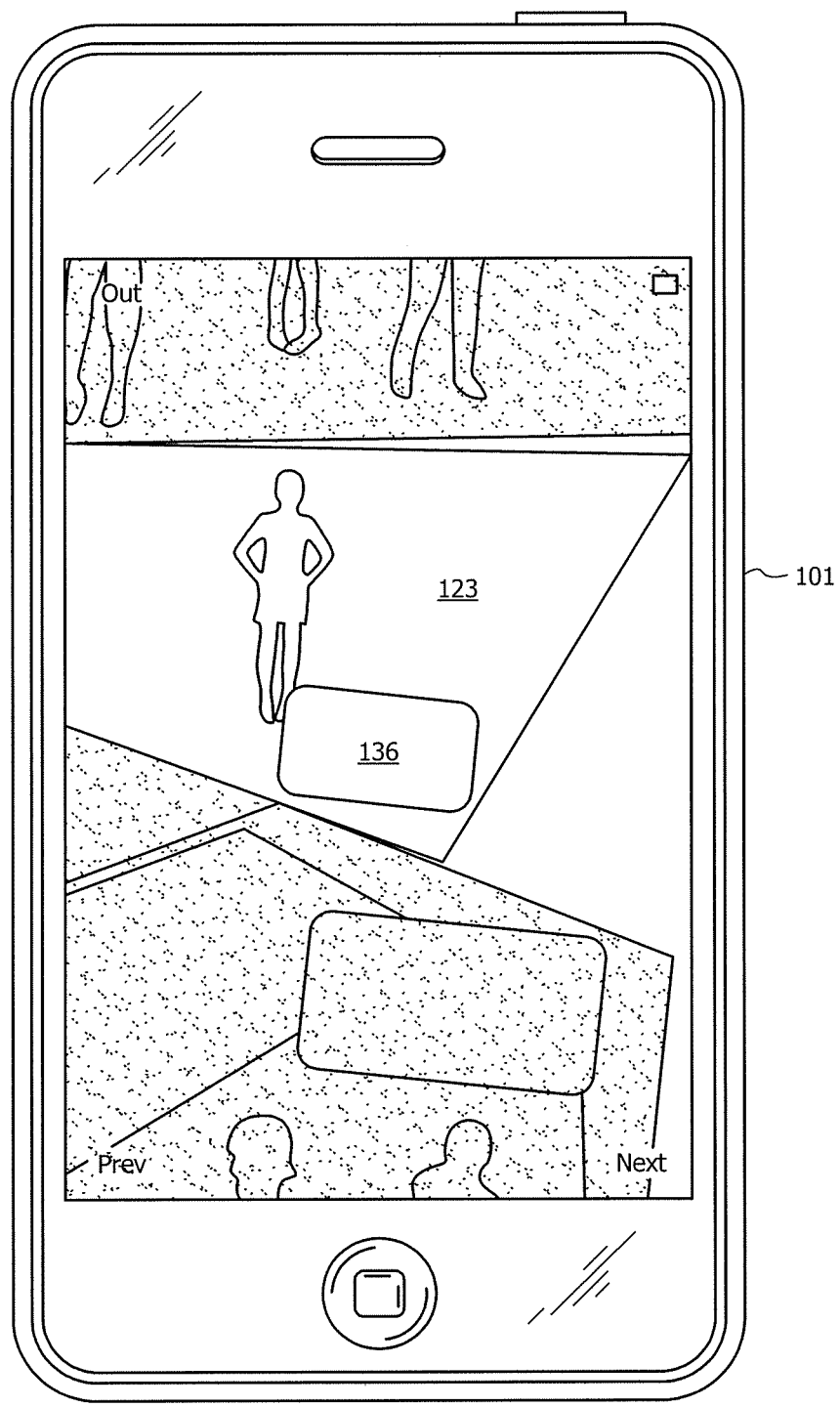
Figure 6:
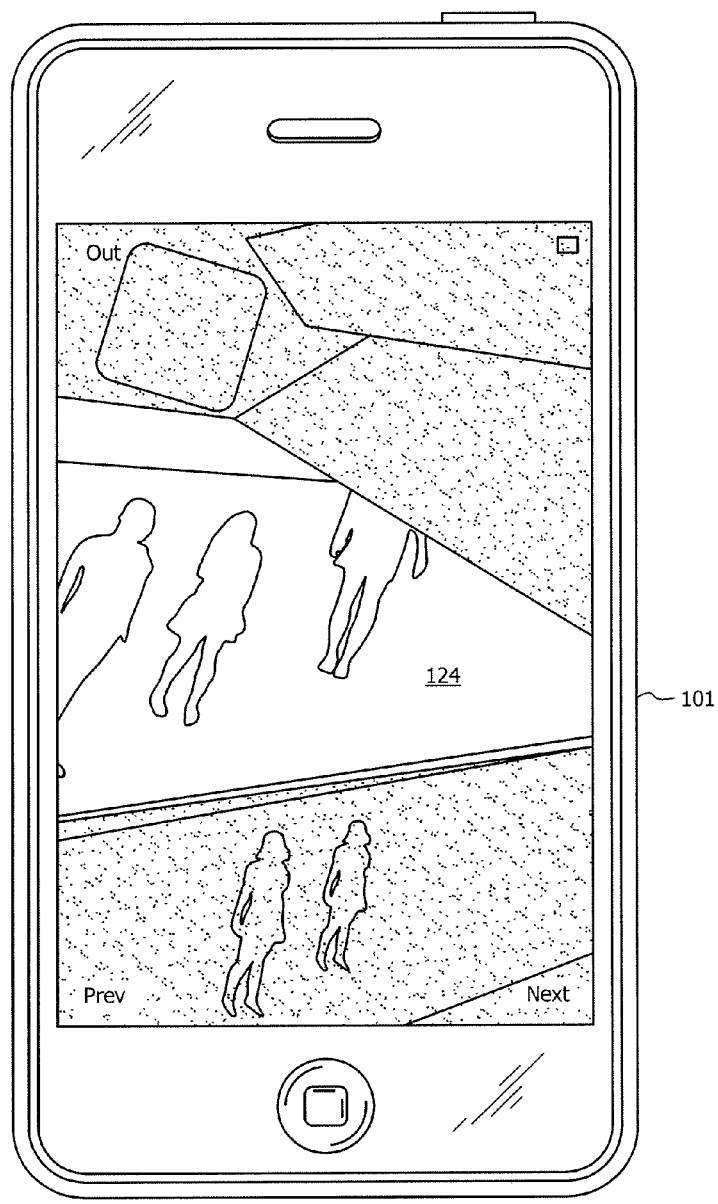
Figure 7:
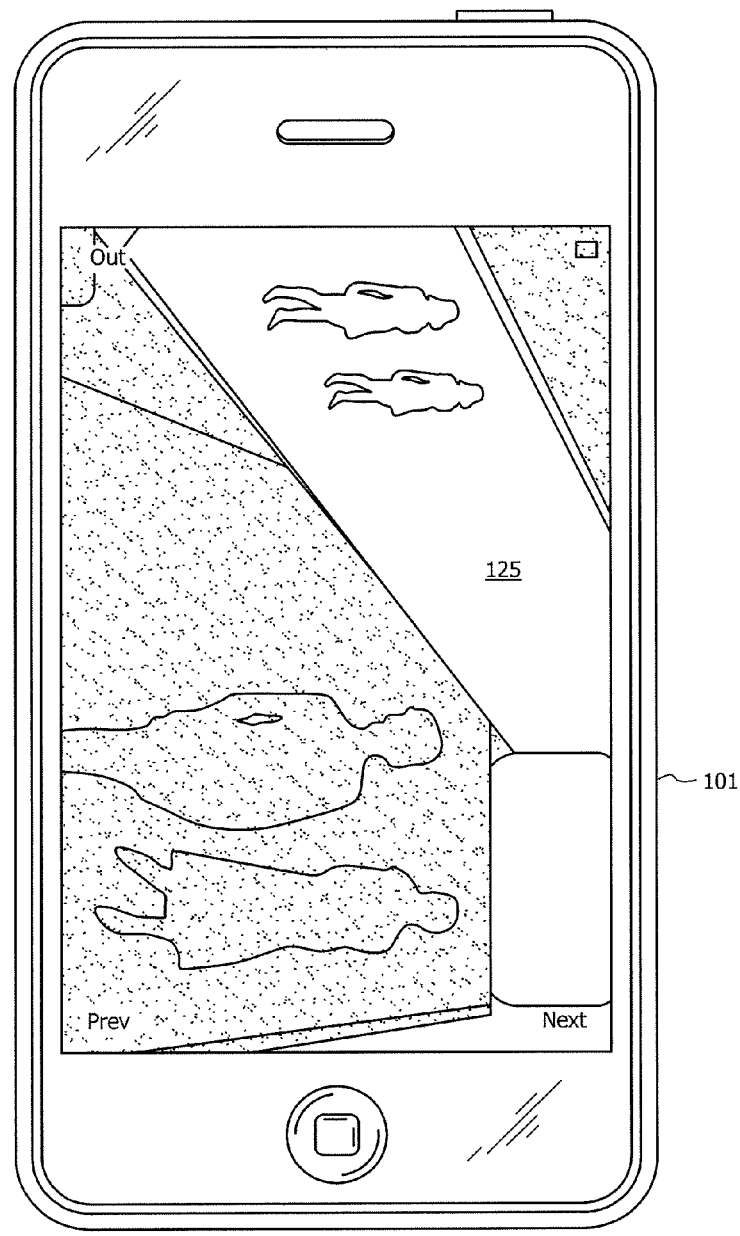
Figure 8:
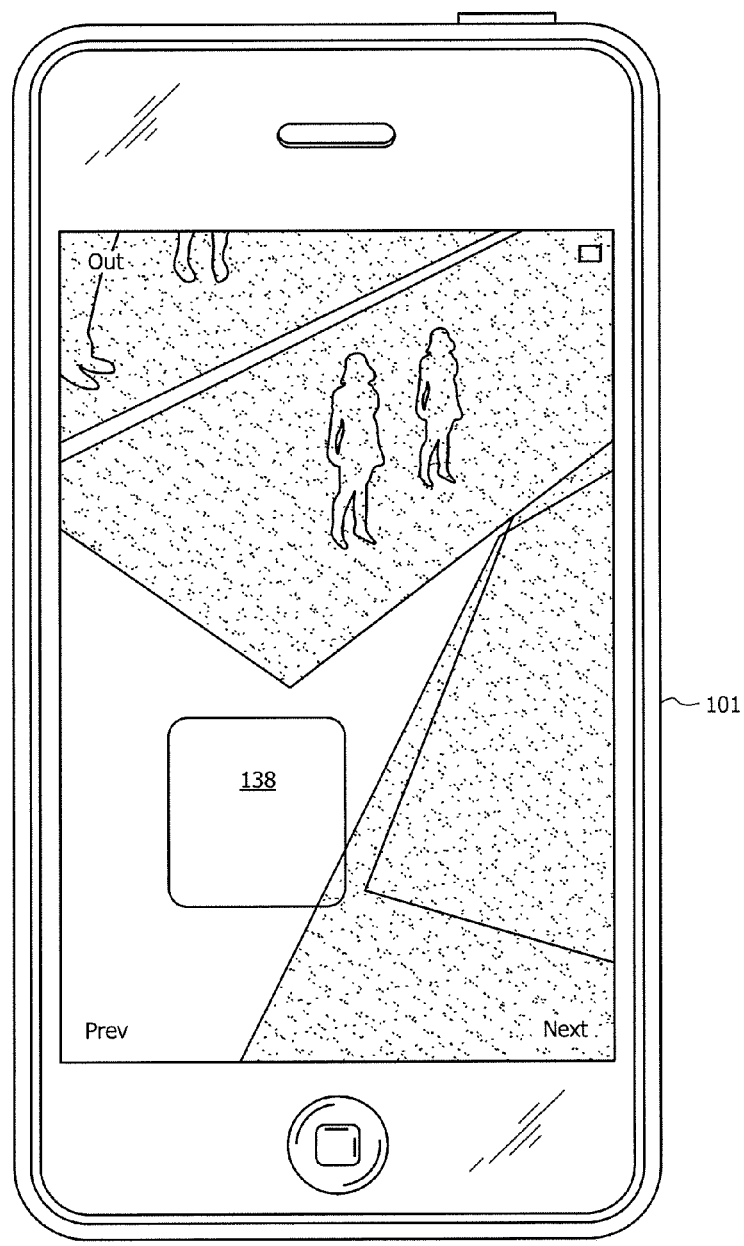
Figure 9:
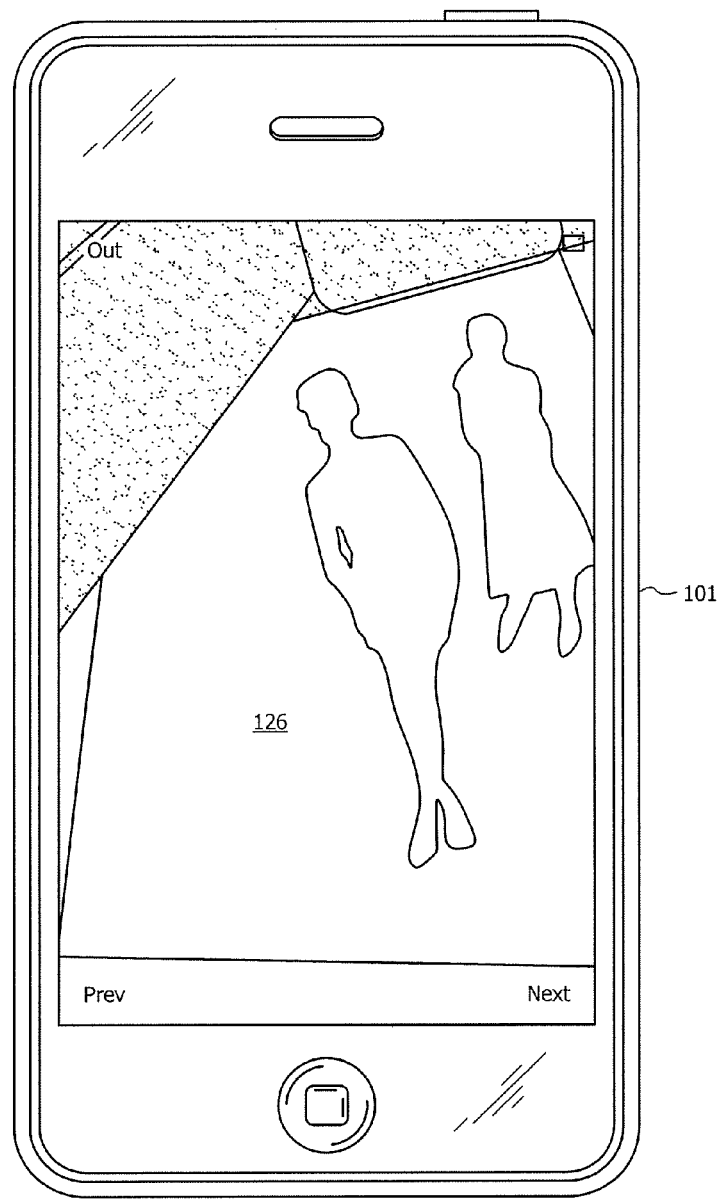

As the user continues to go from cell-to-cell, similar positioning, zooming, panning, rotating (if applicable) and fading are performed to give the user an appealing feel—one that is organic and intuitive. When the user selects next 111 again, the view shown in FIG. 4 is rendered. In FIG. 4, the text box 135 is enlarged and moved to make it easier to read. FIGS. 2-9 show the views that are rendered as the user selects next 111 to view all cells on the page. The cell that is the focus of FIG. 7 is actually a landscape screen—wider than it is tall—and the application assumes that the user is going to rotate the device so that the user will be able to view cell 125 in a more natural, larger way. As the user selects next 111 again, the next view is portrait (FIG. 8), and the application assumes that the user is going to rotate the device back to its portrait view. As the user walks through a page like this, the idea is that the user, as part of experiencing the content, will rotate the phone back and forth as the user goes from cell to cell.

The application shown in FIGS. 1-9 addresses a problem in current comic book readers. A comic is created as an artistic, creative expression often without awareness that it might be consumed on a device with a small fixed-size screen, so sometimes the content items are wider than they are tall and sometimes they are taller than they are wide. Various embodiments of the present invention make an effective use of the screen so that the content is visually perceivable and the text is readable.

Referring back to FIG. 1, there is control 113. At any point, a user can zoom out the entire page (i.e., go back to the view shown in FIG. 1) by selecting control 113. Furthermore, the various cells 121-126 are selectable items where a user can select one of the cells, and the viewing application will take the user directly into that cell and still do an appealing transition with a camera view that moves until the appropriate placement, size, rotation, and fading are rendered. So some users might actually choose to read the comic in that way, by stepping in and out of the cells.

While not easily shown in FIG. 1-9, various embodiments support commonly accepted touch-based gestures. Similar to current viewers, the viewing application of FIGS. 1-9 transitions back and forth between cells with a finger swipe from one side to the next. Thus, finger swipes may be used instead of, or in addition to, control features 111 and 112. In the present case, a finger swipe from one side of screen 102 to the other is effective to cause a transition to an adjacent cell even though the page is arranged substantially vertically (rather than horizontally). In this way, various embodiments can be adapted for use with any of a variety of arbitrary shapes and arrangements. Furthermore, in many embodiments, the orientation of gestures are adjusted to correspond to orientation of the screen. Thus, a side-to-side finger swipe is still a side-to-side finger swipe whether the device is arranged portrait-style or landscape-style.

Figure 10:
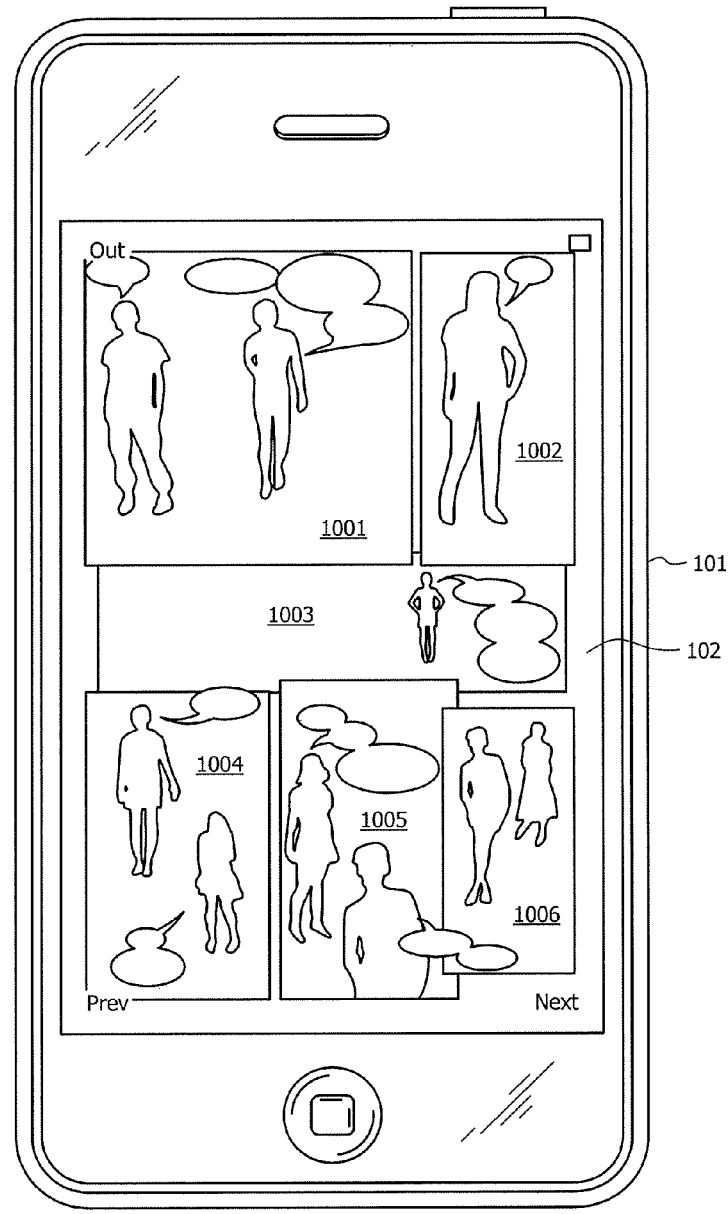
FIGS. 10-16 show a second example of the viewing application using different graphical content.
Figure 11:
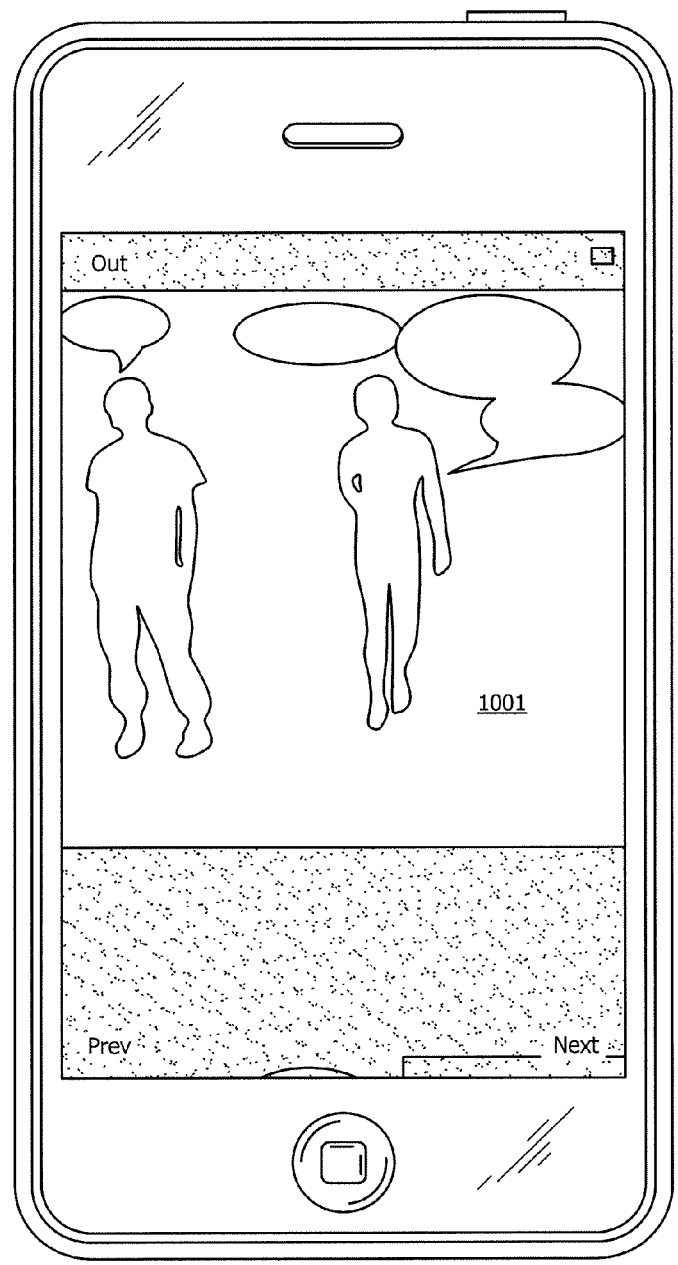
Figure 12:
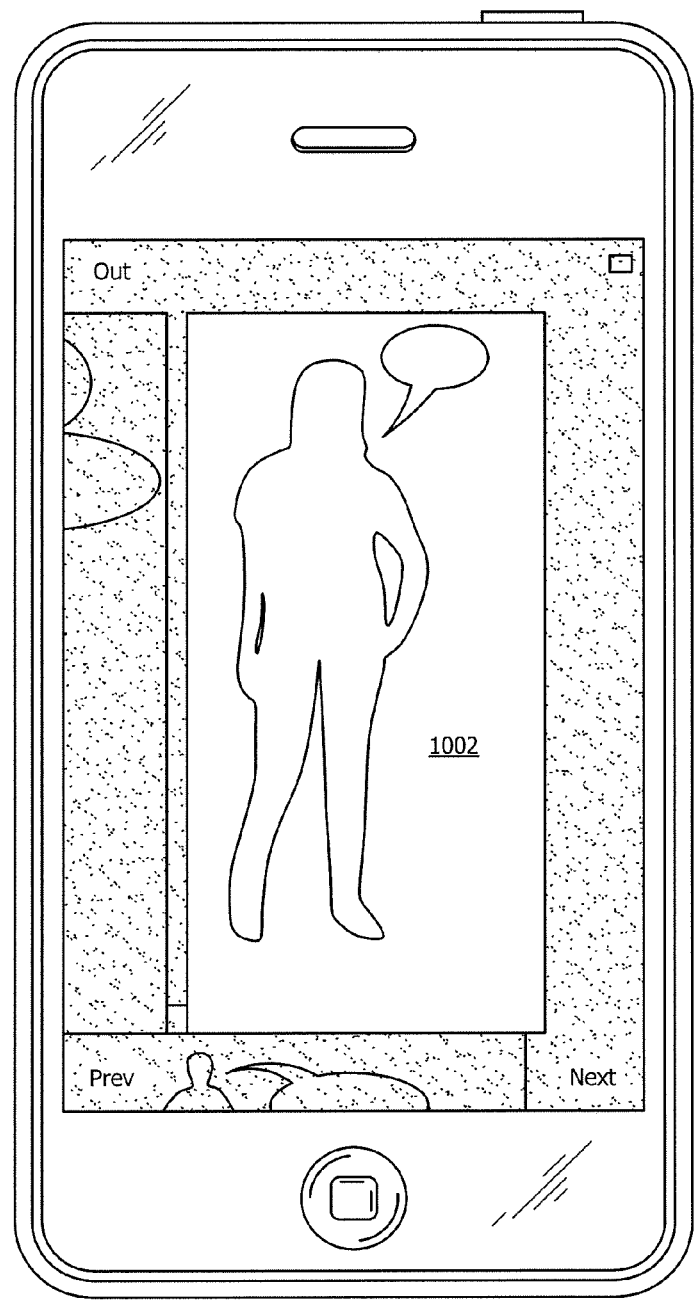
Figure 13:
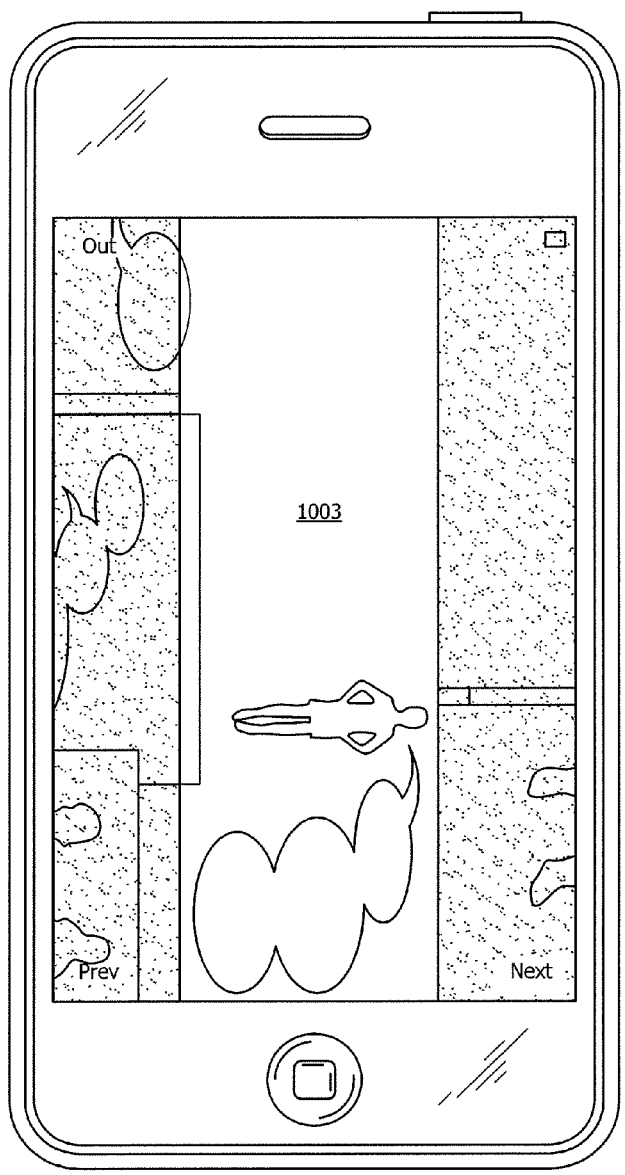
Figure 14:
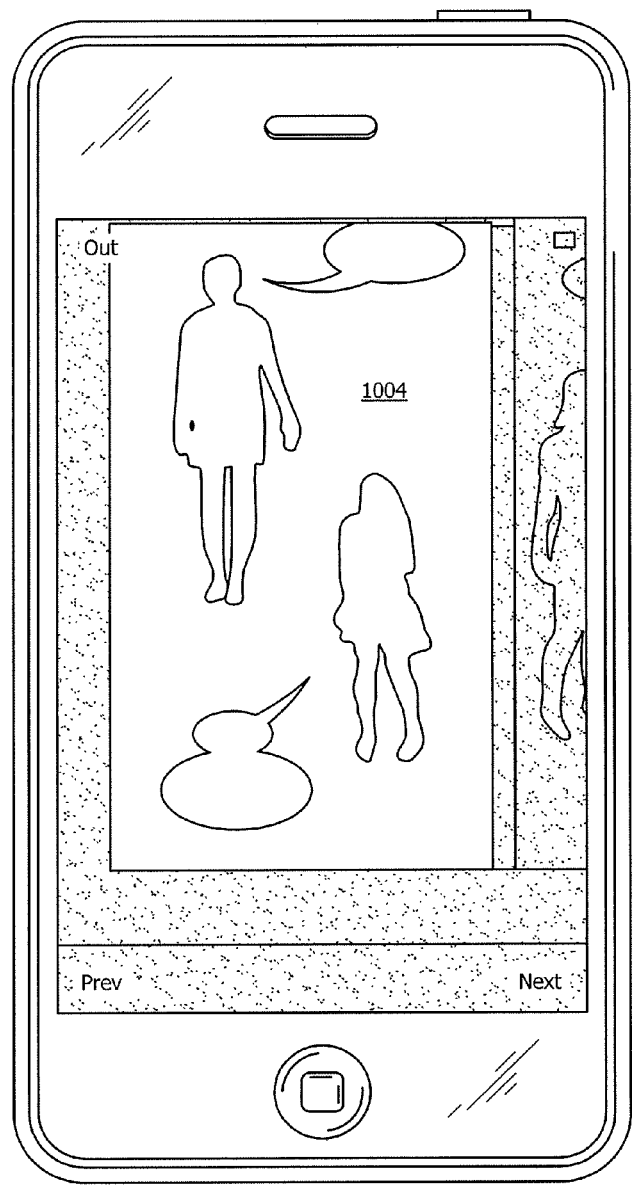
Figure 15:
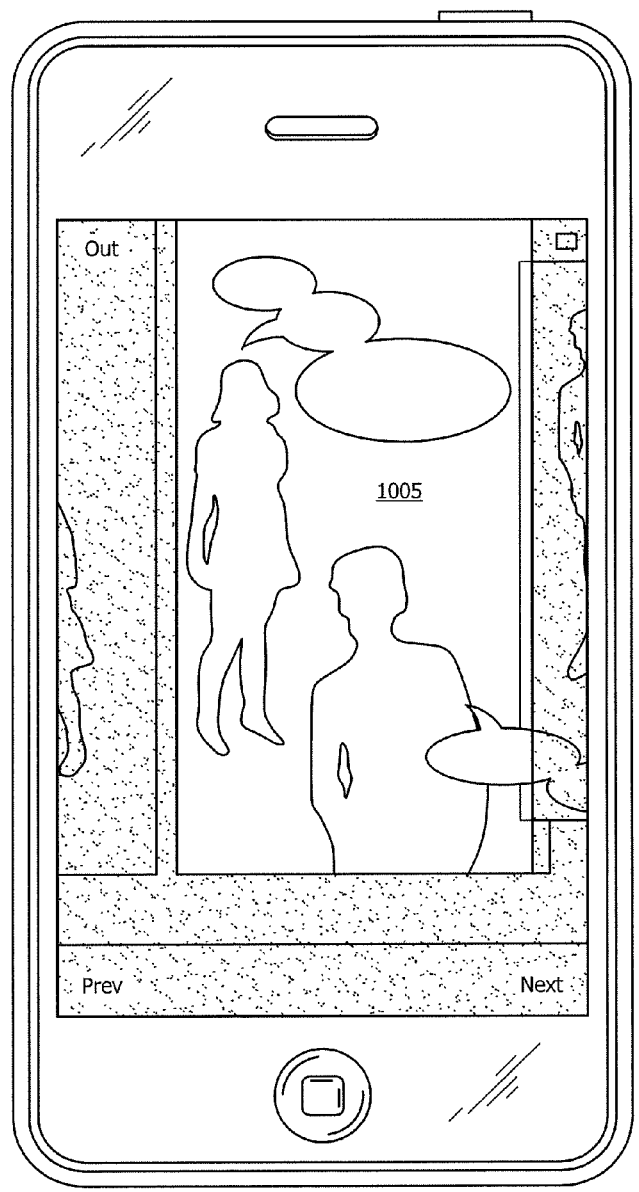
Figure 16:
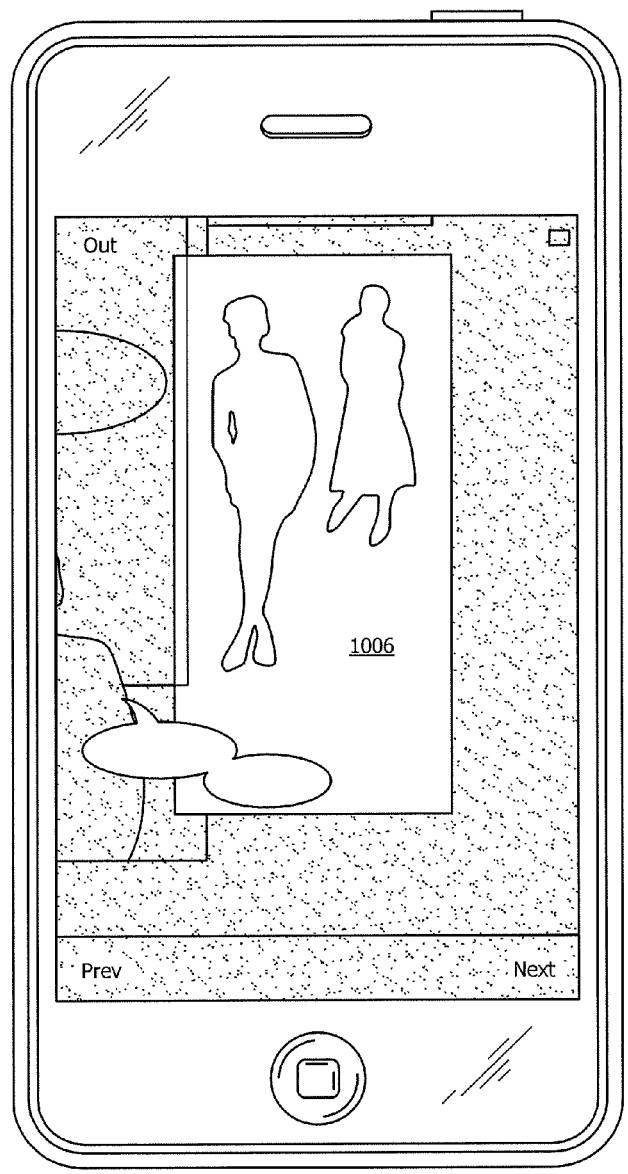

FIGS. 10-16 show a second example using different graphical content. In FIGS. 10-16, the cells are rectangles and are, therefore, more regular than the cells of FIGS. 1-9. FIG. 10 shows the whole page, where a user can select a particular cell and where the user can return by selecting control 113. FIGS. 11-16 show a sequential transition among the cells, including at least one portrait-landscape-portrait transition, and extensive use of zooming.

Automatic portrait-landscape-portrait transitioning is unconventional, but provides a good use of screen space. However, such automatic transitioning may not be preferred by all users. Some embodiments include a control, such as control 190 of FIG. 1, allowing a user to disable automatic portrait-landscape-portrait transitioning. In such case, the application may split a landscape cell into multiple portrait views, or split a portrait cell into multiple landscape views.

In another aspect, some embodiments include a computer-based tool that allows a designer, developer, author, artist, or other user to add metadata to existing media content to prepare the media content for display according to the concepts discussed above. There are variety of different types of metadata that can be added to existing content, and the present examples list a few. The original image has a sequence of views—cells in the case of comic books—that the end-user will perceive, and there is metadata associated with each of those viewpoints. One metadata item is referred to as a viewpoint, which includes a center point of that view, a magnification, and a rotation. Another metadata item includes a sequence of polygons to adjust opacity of items that surround a given cell, referred to as polygonal overlays, and they form the basis of the masks.

Yet another example of metadata includes an indication of the visually most salient point in that cell. Often, the visually most salient point is determined by a developer or other user, who uses intuition or other technique to decide which point is most likely the most salient to end-users. The viewing application supports random access into any cell by tapping directly onto a portion of the cell to zoom right into it. So in order to support that feature, viewing applications receive the indications of salient points because the cells can actually be overlapping. In order to know which cell an end-user selects, it is assumed that users are most likely to tap on the visually most salient characteristic of one of those cells (e.g., the main figure's face). When a user selects a point on the screen, the viewing application looks for the closest salient point and goes to the cell associated with that closest salient point. The computer based tool of various embodiments allows a user to designate salient points in the various portions of the page.

Figure 17:
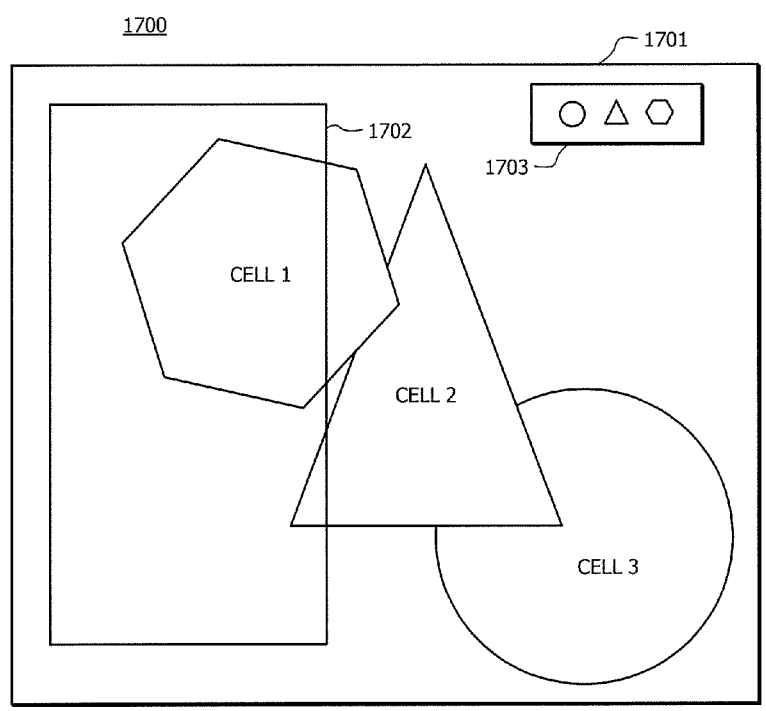
FIG. 17 is an illustration of exemplary computer-based tool adapted according to one embodiment of the invention.

FIG. 17 is an illustration of exemplary computer-based tool 1700, adapted according to one embodiment of the invention. In the example embodiment, computer-based tool 1700 includes interface 1701, where for each page a user defines at least the viewpoint, the polygonal overlay, and the salient points. In this example, the interface includes rectangle 1702, which is sized to correspond to the screen of a given handheld device (e.g., an iPhone™). The user drags rectangle 1702 around on the screen, rotates it, and resizes it to define a given viewpoint. Interface 1701 also provides polygon tool 1703 to draw polygons to cover the portions of the view that are the parts that the user wants to de-emphasize in order to define the polygonal overlay. Interface 1701 also supports a user's selection (by mouse, touchscreen or otherwise) in order to specify the salient portion of the screen that will be used for navigation. The user defines the metadata for each of the views or cells manually in this way.

One issue with the embodiment described above is that it can be somewhat time consuming because these views can be arbitrarily shaped and arranged with different angles and different sizes. For instance, it might take a relatively long time for a human user to draw the polygonal overlay to cover up one of these strangely shaped lines or triangular views that can be part of the source image. Another embodiment uses automated image processing techniques to increase efficiency. In such an example, interface 1701 allows the user to select the salient points for the viewpoints (or for a single viewpoint if the user prefers to go viewpoint-by-viewpoint). Tool 1700 includes computer vision to analyze the image, looking for the boxes and lines and likely interesting areas and it makes a best estimation as to the viewpoint metadata item and the polygonal overlay metadata item. Tool 1700 makes a best estimation as to the best view and as to the polygons that should be generated in order to hide the uninteresting parts. In many cases, the image processing has a particularly good chance of working because, for many kinds of content, such as comics and other visually-oriented books, such content typically has white backgrounds or solid or simple gradient backgrounds with lines that typically follow the black lines that define the area as well. It is possible to do computer vision or image processing algorithms that identify those lines with high accuracy. While the examples herein mention comic book material for the underlying content, it is noted that any of a variety of graphical content can be modified by, or viewed by, various embodiments of the invention.

When the first estimate is acceptable, the user indicates acceptance and moves the process on to the next task (e.g., moving on to the next cell). If the user does not think that the computer's estimate is acceptable, then the user can manually manipulate the view and/or the polygons. In such a case the computer has already identified the lines and the polygons and the underlying image, giving the human user more to work with in defining the viewpoint and/or the polygonal overlay. In fact, some embodiments include a snap-to feature to automatically snap views on polygons to the next best item, so when a user drags a view, tool 1700 snaps it to the next set of lines. In some instance, the computer might get it all right, and the user might just verify the computer's estimates. Thus, for simpler source images, the automatic embodiment has the potential to be quite efficient. For more complex and difficult source images, the process might simply be manual in the worst-case scenario.

Figure 18:
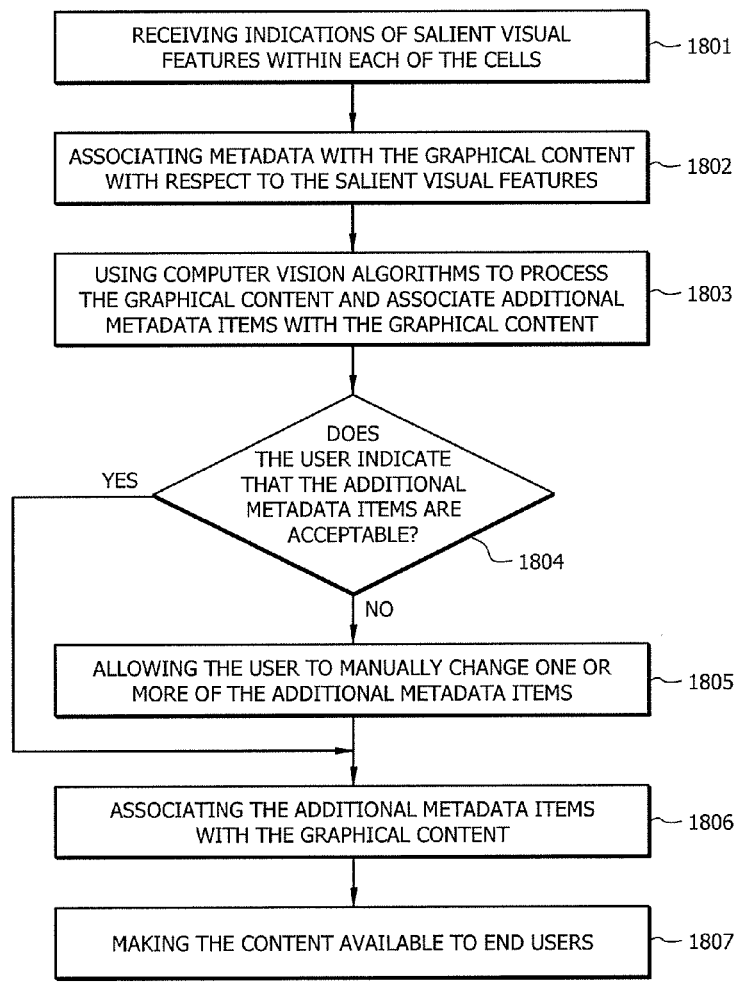
FIG. 18 is an illustration of an exemplary method, according to one embodiment of the invention.

FIG. 18 is an illustration of exemplary method 1800 according to one embodiment of the invention. Method 1800 can be performed, for example, by a computer-based tool to add metadata to graphical content. The graphical content is divided into a plurality of portions (e.g., cells). As explained above, the user indicates the salient points of the cells, and the tool makes a best estimate of other types of metadata items, such as polygonal overlays, rotation, magnification, and position (at blocks 1801-1803). The user can then accept the computer's metadata, reject some, or reject all of the metadata at block 1804. For metadata that is rejected, the user is given an opportunity to modify the items manually at block 1805. The tool associates metadata with each of the cells and makes the content available to end-users (e.g., by publishing to an Internet resource) at blocks 1806-1807.

Other types of metadata may be indicated manually and/or generated automatically by the computer-based tool. An additional type of metadata can refer to pixels of a cell that correspond to text, whether the text is by itself, in a balloon, or included in another arbitrary shape. Such data can be used to "pop-out" the text, moving it and/or making it larger to increase readability. For instance, in some situations, text (at least in its original form) may be too small to read on a handheld device screen. Various embodiments identify where the text is located and magnify the text. The degree of magnification can be determined from a combination of design and end-user preference. In one example, an end-user might prefer fourteen-point font, so the text is marked to be magnified to fourteen-point font by the viewing application. Additionally or alternatively, there may be a default where the text is marked to magnify it ten or twenty percent or thirty percent to make it still larger and still visually more salient.

One variation of popping out the text is, instead of popping the text out automatically at the viewing application, allowing the end-user to select the text to pop the text out. Some embodiments may add other visual schemes to enhance aesthetic or artistic effect by, e.g., enlarging text with a bounce or other animated sequence make the experience more like video. In fact, any of a variety of visual effects can be added to the underlying content through use of metadata.

In one example, the images are preprocessed to generate views wherein the text, itself is the focus (e.g., as in FIG. 4). In other examples, the text is magnified within a graphic cell. In some instances where there are multiple text boxes, magnifying them all in place would cause them to overlap. One such solution is to add metadata that specifies parts of the image that a given text box should not cover.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 19:
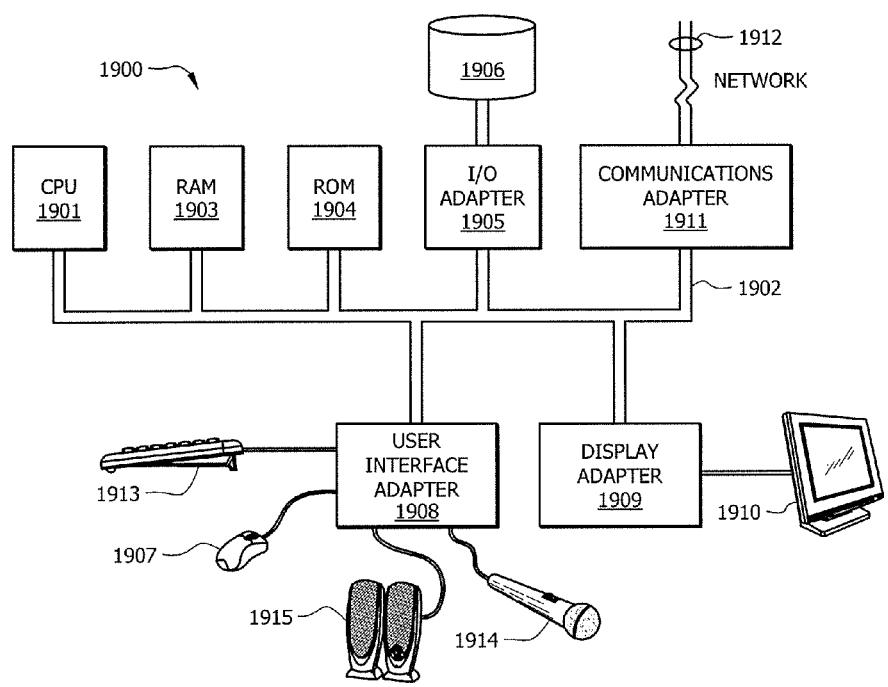
FIG. 19 illustrates an example computer system adapted according to one embodiment of the present invention.

FIG. 19 illustrates an example computer system 1900 adapted according to one embodiment of the present invention. That is, computer system 1900 comprises an example system on which embodiments of the present invention may be implemented (such as a viewing application or a tool to modify graphical content). Central processing unit (CPU) 1901 is coupled to system bus 1902. CPU 1901 may be any general purpose or specialized purpose CPU. However, the present invention is not restricted by the architecture of CPU 1901 as long as CPU 1901 supports the inventive operations as described herein. CPU 1901 may execute the various logical instructions according to embodiments of the present invention. For example, one or more CPUs, such as CPU 1901, may execute machine-level instructions according to the exemplary operational flows described above regarding the respective operation of the viewer application and/or the content-modifying tool.

Computer system 1900 also preferably includes random access memory (RAM) 1903, which may be SRAM, DRAM, SDRAM, or the like. In this example, computer system 1900 uses RAM 1903 to buffer 302 of FIG. 3. Computer system 1900 preferably includes read-only memory (ROM) 1904 which may be PROM, EPROM, EEPROM, or the like. RAM 1903 and ROM 1904 hold user and system data and programs, as is well known in the art.

Computer system 1900 also preferably includes input/output (I/O) adapter 1905, communications adapter 1911, user interface adapter 1908, and display adapter 1909. I/O adapter 1905, user interface adapter 1908, and/or communications adapter 1911 may, in certain embodiments, enable a user to interact with computer system 1900 in order to input information, such as indicating salient features (e.g., with respect to a tool to modify the graphical content) or select a cell to view (e.g., with respect to a viewing application).

I/O adapter 1905 preferably connects to storage device(s) 1906, such as one or more of hard drive, compact disc (CD) drive, floppy disk drive, tape drive, etc. to computer system 1900. The storage devices may be utilized when RAM 1903 is insufficient for the memory requirements associated with storing media data. Communications adapter 1911 is preferably adapted to couple computer system 1900 to network 1912 (e.g., the Internet, a LAN, a cellular network, etc.). User interface adapter 1908 couples user input devices, such as keyboard 1913, pointing device 1907, and microphone 1914, a touch screen (such as 102 of FIG. 1) and/or output devices, such as speaker(s) 1915 to computer system 1900. Display adapter 1909 is driven by CPU 1901 to control the display on display device 1910 to, for example, display the media as it is played.

While FIG. 19 shows a general-purpose computer, it should be noted that the exact configuration of a portion of a system according to various embodiments may be slightly different. For example, devices that run a viewing application according to one or more embodiments may be any kind of processor-based device that includes a small screen, such as a cell phone, a Personal Digital Assistant (PDA), and/or the like. Additionally, devices that run metadata tool applications according to one or more embodiments may be any kind of processor-based device, such as a personal computer, a server-type computer, a handheld device, and the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-based method for rendering modified graphical content, the graphical content including a plurality of cells, the method comprising:
   rendering the graphical content upon a screen according to metadata that modifies the graphical content;
   defining, by a processor, polygonal overlay metadata for each cell in at least a subset of the plurality of cells, wherein the polygonal overlay metadata includes a sequence of polygons defining a surrounding area for said each cell;
   rendering, under control of the processor, the sequence of polygons, in accordance with the polygonal overlay metadata, such that the defined surrounding area is adjusted in opacity and is de-emphasized with respect to salient features within said each cell;
   receiving user input; and
   in response to the user input, progressing through the at least a subset of the cells, wherein the progressing includes moving a camera view from cell to cell, each of the cells in the at least a subset being displayed as a focus point with the surrounding area being adjusted in opacity according to the polygonal overlay metadata, wherein the metadata specifies the polygonal overlay metadata;
   wherein the rendering comprises:
   receiving user input selecting a portion of the graphical content;
   comparing the selected portion of the graphical content to the salient features in the metadata;
   selecting a first cell of the plurality of cells based upon the comparing;
   in response to selecting the first cell, displaying the first cell as a focus point by adjusting opacity of one or more other cells of the plurality of cells according to the polygonal overlay metadata;
   receiving a second user input;
   comparing information associated with the second user input to the salient features in the metadata;
   selecting a second cell of the plurality of cells based upon the comparing; and
   in response to selecting the second cell, displaying the second cell as a focus point by adjusting opacity of the other cells of the plurality of cells according to the polygonal overlay metadata, the other cells including at least the first cell.

2. The method of claim 1 wherein the progressing further comprises:
   applying a pan, a zoom, and a rotation to each of the cells in the at least a subset according to the metadata.

3. The method of claim 1 wherein the progressing further comprises:
   moving the camera view in response to a finger swipe on the screen.

4. The method of claim 3 wherein a direction of the finger swipe and a direction of movement of the camera view are not the same.

5. The method of claim 1 wherein said user input includes finger swipes on the display screen, and wherein directions of finger swipes are adjusted according to orientations of the individual ones of the cells.

6. The method of claim 1 wherein the progressing further comprises:
automatically switching from a landscape view of the graphical content to a portrait view of the graphical content when moving the camera view.

7. The method of claim 1 wherein the progressing further comprises:
applying one or more magnifications and orientations to text within each of the cells according to the metadata.

8. The method of claim 1 further comprising:
performing a zoom-out to show a plurality of cells in response to a selection of a control feature rendered upon the screen.

9. The method of claim 1 wherein the graphical content includes comic book content.

10. The method of claim 1 performed upon a handheld device.

11. The method of claim 1 in which the metadata further specifies at least one of the following:
salient features for the cells;
center point, magnification, and rotation for each of the cells;
pixels corresponding to text within each cell; and
areas of each cell not to be obstructed by text.

12. The method of claim 1 performed by a handheld device with a touchscreen for receiving the user input.

13. A computer program product having a non-transitory computer readable medium having computer program logic recorded thereon for rendering modified graphical content, the graphical content including a plurality of cells, said computer program product comprising:
code for rendering the graphical content upon a screen according to metadata, the metadata modifying the graphical content, the metadata specifying a viewpoint for each of the cells and a polygonal overlay for each of the cells;
code for defining polygonal overlay metadata for each cell in at least a subset of the plurality of cells, wherein the polygonal overlay metadata includes a sequence of polygons defining a surrounding area for said each cell;
code for rendering the sequence of polygons, in accordance with the polygonal overlay metadata, such that the defined surrounding area is adjusted in opacity and is de-emphasized with respect to salient features within said each cell;
code for receiving user input; and
code for progressing through the at least a subset of the cells, in response to the user input, wherein the progressing includes moving a camera view from cell to cell, each of the cells in the at least a subset being displayed as a focus point with the surrounding area being adjusted in opacity according to the metadata, wherein the metadata specifies the polygonal overlay metadata;
wherein the rendering comprises:
receiving user input selecting a portion of the graphical content;
comparing the selected portion of the graphical content to the salient features in the metadata;
selecting a first cell of the plurality of cells based upon the comparing;
in response to selecting the first cell, displaying the first cell as a focus point by adjusting opacity of one or more other cells of the plurality of cells according to the polygonal overlay metadata;
receiving a second user input;
comparing information associated with the second user input to the salient features in the metadata;
selecting a second cell of the plurality of cells based upon the comparing; and
in response to selecting the second cell, displaying the second cell as a focus point by adjusting opacity of the other cells of the plurality of cells according to the polygonal overlay metadata, the other cells including at least the first cell.

14. The computer program product of claim 13 wherein the metadata further specifies:
pixels corresponding to text within each cell; and
areas of each cell not to be obstructed by text.

15. The computer program product of claim 13 wherein the metadata further specifies a salient feature for each of the cells, the method further comprising code for receiving user input selecting a particular cell by selecting a salient feature associated with the particular cell.

16. The computer program product of claim 13 in which the polygonal overlay comprises polygonal masks for adjusting opacity of areas around each of the cells.

17. The computer program product of claim 13 in which the viewpoint comprises:
center point, magnification, and rotation for each of the cells.

18. A computer system for rendering modified graphical content, the graphical content including a plurality of cells, the computer system comprising a central processing unit to perform the following functions:
defining polygonal overlay metadata for each cell in at least a subset of the plurality of cells, wherein the polygonal overlay metadata includes a sequence of polygons defining a surrounding area for said each cell;
rendering the graphical content upon a screen according to metadata, the metadata modifying the graphical content by specifying a viewpoint and the polygonal overlay for each of the cells, said rendering the graphical content comprising:
rendering the sequence of polygons, in accordance with the polygonal overlay metadata, such that the defined surrounding area is adjusted in opacity and is de-emphasized with respect to salient features within said each cell;
receiving user input; and
in response to the user input, moving a rendered view from cell to cell, each of the cells in the at least a subset being displayed as a focus point with the surrounding area being adjusted in opacity according to the metadata;
wherein the rendering comprises:
receiving user input selecting a portion of the graphical content;
comparing the selected portion of the graphical content to the salient features in the metadata;
selecting a first cell of the plurality of cells based upon the comparing;
in response to selecting the first cell, displaying the first cell as a focus point by adjusting opacity of one or more other cells of the plurality of cells according to the polygonal overlay metadata;

receiving a second user input;
comparing information associated with the second user input to the salient features in the metadata;
selecting a second cell of the plurality of cells based upon the comparing; and
in response to selecting the second cell, displaying the second cell as a focus point by adjusting opacity of the other cells of the plurality of cells according to the polygonal overlay metadata, the other cells including at least the first cell.

19. The computer system of claim 18 wherein the metadata specifies salient features for the cells, and wherein the functional units further perform the following functions:
receiving user input selecting a portion of the graphical content;
comparing the selected portion of the graphical content to the salient features in the metadata; and
selecting one of the cells based upon the comparing.

20. The computer system of claim 18 comprising:
a handheld device with a touchscreen for receiving the user input.

* * * * *